United States Patent
Aithal et al.

(10) Patent No.: US 11,540,014 B2
(45) Date of Patent: Dec. 27, 2022

(54) USER BASED ELECTRONIC MEDIA ALTERATION

(71) Applicant: International Business Machines Corporation, Armonk, NY (US)

(72) Inventors: Sharath Kumar Aithal, Bangalore (IN); Parthasarthi Komperla, Bangalore (IN); Srinivas Pusapati, Bangalore (IN); Vamshidhar Cholleti, Telangana (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/008,811

(22) Filed: Sep. 1, 2020

(65) Prior Publication Data

US 2022/0070526 A1  Mar. 3, 2022

(51) Int. Cl.
*H04N 21/454* (2011.01)
*H04N 21/441* (2011.01)
*H04N 21/442* (2011.01)
*H04N 21/45* (2011.01)

(52) U.S. Cl.
CPC ....... *H04N 21/4542* (2013.01); *H04N 21/441* (2013.01); *H04N 21/44218* (2013.01); *H04N 21/4532* (2013.01)

(58) Field of Classification Search
CPC ............. H04N 21/4542; H04N 21/441; H04N 21/44218; H04N 21/4532
See application file for complete search history.

(56) References Cited

U.S. PATENT DOCUMENTS

| | | | |
|---|---|---|---|
| 10,904,617 B1* | 1/2021 | Labarre | H04N 21/233 |
| 2002/0147782 A1 | 10/2002 | Dimitrova et al. | |
| 2012/0151217 A1* | 6/2012 | Porter | H04N 21/4542 |
| | | | 713/178 |
| 2012/0246732 A1 | 9/2012 | Burton | |
| 2012/0311625 A1 | 12/2012 | Nandi | |
| 2015/0070516 A1* | 3/2015 | Shoemake | H04N 21/44008 |
| | | | 348/207.11 |

(Continued)

OTHER PUBLICATIONS

Bhattacharya S. and Sinha, M., "Micro-Personalization for consumer engagement & experience on OTT platforms", 7 pages, Apr. 24, 2020.

(Continued)

*Primary Examiner* — Jefferey F Harold
*Assistant Examiner* — Alexander Boyd
(74) *Attorney, Agent, or Firm* — Kelsey M. Skodje (57) ABSTRACT

A first electronic media is received at a first display device. The first display device is located in a first environment. One or more metadata items may be identified based on the first electronic media. The one or more metadata items associated with at least one portion of the first electronic media. One or more users is detected, including a first user, in the first environment. A view permission of the first user is determined based on the one or more metadata items. The view permission indicates whether the first user is permitted to view the at least one portion of the first electronic media. An electronic media update to the first electronic media is performed based on the view permission of the first user. The updated first electronic media is displayed by the first display device after performing the electronic media update.

17 Claims, 5 Drawing Sheets

(56) References Cited

U.S. PATENT DOCUMENTS

| | | |
|---|---|---|
| 2015/0082338 A1 | 3/2015 | Logan |
| 2015/0339461 A1 | 11/2015 | Min et al. |
| 2016/0080510 A1* | 3/2016 | Dawoud Shenouda Dawoud ...... H04N 21/4542 709/225 |
| 2016/0150278 A1* | 5/2016 | Greene .............. H04N 21/4542 725/28 |

OTHER PUBLICATIONS

Mell, P et al., "The NIST Definition of Cloud Computing", Recommendations of the National Institute of Standards and Technology, NIST Special Publication 800-145, 7 pages, Sep. 2011.

* cited by examiner

USER BASED ELECTRONIC MEDIA ALTERATION

BACKGROUND

The present disclosure relates to providing electronic media, and more specifically, to providing electronic media based on one or more users in an environment.

Electronic media may be provided to users through a network or on digital media. Electronic media may include video content, audio content, and in some cases, a combination of audio and visual electronic media (e.g., audiovisual content). The electronic media may include various electronic media elements ("element"). Each element may be a scene, section, or portion of the electronic media that contains certain themes, content, or depictions. Each portion may be relevant or desirable only to a subset of users.

SUMMARY

According to embodiments, disclosed are a method, system, and computer program product.

A first electronic media is received at a first display device. The first display device is located in a first environment. One or more metadata items may be identified based on the first electronic media. The one or more metadata items may be associated with at least one portion of the first electronic media. One or more users is detected, including a first user, in the first environment. A view permission of the first user is determined based on the one or more metadata items. The view permission indicates whether the first user is permitted to view the at least one portion of the first electronic media. An electronic media update to the first electronic media is performed based on the view permission of the first user. The updated first electronic media is displayed by the first display device after performing the electronic media update.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to consuming electronic media, more particular aspects relate to providing electronic media based on one or more users in an environment. While the present disclosure is not necessarily limited to such applications, various aspects of the disclosure may be appreciated through a discussion of various examples using this context.

Electronic media may be content that may be provided through a disc, tape, or other physical media. With the rise in popularity of the Internet and other computer networks, there may increasingly be opportunities to provide digital media through networks. For example, digital media may be streamed in the form of television, sports, movies, music, podcasts, and other content.

Electronic media may be classified or categorized based on one or more factors. For example, movies may be given a rating such as "rated R" or "rated PG-13" based on overall themes or messages in the content. This rating information may be provided in a manner that users may inform themselves of the content before it is viewed. For example, a parent may look at the outside packaging of a movie and determine that the rating on the movie is appropriate for viewing by a child. With the advent of network distribution of digital media, a user may not be advised in advance of the type of content that is depicted in electronic media. For example, a family may be listening to an album of music from a music streaming service in a car. Many individual songs may be appropriate for all users of the family, but certain songs may contain individual words or phrases that are not appropriate for everyone.

Some potential ways to fix the content issues of electronic media may be of limited value or can be implemented in only awkward ways. In one example, electronic media providers (e.g., of devices and/or services) may operate by receiving edited or altered versions of media content. For example, a movie that has an adult rating may be pre-edited to remove any content that is deemed inappropriate for a certain audience. There are a few drawbacks to providing pre-edited electronic content. One drawback is that some users may wish to access the original version of an electronic media. For example, an artsy film may include adult themes and depictions, and an adult couple without children in a home or apartment may wish to view and consume the artsy film in its original version. Another drawback is that media providers may need to store or provide multiple versions of electronic media (e.g., a version of a song with certain words or phrases removed, and another unaltered version of the same song). The many different versions of electronic media cause storage and processing overhead for media providers.

Another attempt at fixing some issues with providing electronic media is providing media that is completely pre-cataloged. Complete pre-cataloged media may benefit consumers by an inclusion of multiple ratings and other information. These complete pre-cataloged media-providing technologies may operate by reading information associated with each segment or portion of a given electronic media. Each electronic media (e.g., song, tv show, film) may be pre-screened and associated with information that describes the result of the pre-screening (e.g., violence, adult depictions, harsh themes, hateful language).

One drawback of these systems is each electronic media may require the entirety of the media to be reviewed and cataloged. For example, a feature length film may have a runtime of 147 minutes. Complete pre-cataloged media providers may only be able to provide content screening if every segment or portion includes individual ratings. The 147-minute film may include thirty or forty different scenes and may include hundreds of lines of dialog. Each minute, scene, and line of dialog may need to be pre-reviewed and cataloged by hand by a company or processing devices that provides the pre-screened devices and services. The pre-reviewing may be manual labor intensive or require many processing cycles for performing analysis of each electronic media.

Another drawback of complete pre-cataloged media providing technologies is only content that is pre-reviewed may actually be available for viewing or listening while providing filtering or screening of objectionable content. This may yield a device or service that only includes few or no electronic media for all parties. Yet another drawback is that many of these devices and services may rely on an honor system or user-based input of what is appropriate for viewing. For example, a movie may be pre-cataloged and provided to a playback device (e.g., a streaming device in a home). A parent may have set up multiple profiles including a parent profile for viewing all content and a youth profile for allowing the parent's children to only view edited versions of electronic media. The children may be able to guess the credentials of the parent profile and obtain access to all of the electronic media, not just age appropriate electronic media.

User-based electronic media alteration (UEMA) may provide advantages over existing operations to identify and determine an audience viewing a copy of an electronic media and to update or alter the content for the audience. The UEMA may operate based on electronic media that is classified based on metadata. The electronic media may contain various content in the various portions of the electronic media. For example, a feature length motion picture may include a runtime of 139 minutes that includes over sixty innocuous portions, a first adult themed portion, and a first musical portion. The UEMA may classify all of the portions of the motion picture before it is provided to a media device (e.g., a streaming set-top box, a smart TV, a viewing device, a listening device). In some embodiments, the UEMA may not classify all portions of an electronic media. For example, a television show may have thirteen different scenes. The television show may be provided to a streaming media device with only one classification related to the eighth scene of the thirteen scenes. The streaming media device may perform playback of the television show without updating the content. The UEMA may operate on the streaming device by altering or updating only the content associated with the eighth scene.

The UEMA may operate on electronic media that includes pre-classified metadata, e.g., metadata that is included with the electronic media before being provided to a display device. In some embodiments, the UEMA may receive metadata from viewers for updating of a particular electronic media that does not have any pre-classified metadata. For example, a sporting event may be displayed live to a certain subset of viewers that want to watch the sporting event as it happens. The metadata may include one or more metadata items such as tags, timestamps, and the like. The metadata may include tags, which include various information like maturity level, genre, type of the content (e.g., "media type=song," "genre=romance," "base rating=not rated," "most restrictive rating=adult content"). The metadata may include information that indicates which portion of electronic media is associated with the metadata. For example, a first metadata may include a timestamp that indicates the beginning of a first portion of an electronic media associated with the first metadata. In another example, a first metadata may include a frame-count including a starting frame and an ending frame that corresponds to a first portion of a first visual electronic media.

The UEMA may be configured to stream or provide the content in an unaltered format (e.g., without making changes to a video stream based on the metadata). The UEMA may be configured to stream or provide the content in an updated format (e.g., by altering, removing, changing, skipping) based on the one or more associated metadata. For example, a user profile may be created in a home of a streaming smart device. The user profile may include user preferences about the type of electronic media to view or access (e.g., family appropriate video and audio content, rock and roll music). The UEMA may be configured to access the user profile and determine whether the currently streaming content is appropriate to be presented in an environment of any device that is currently providing the content.

The UEMA may be configured to use the preferences of the user profile to make the determination that a particular portion of an electronic media is appropriate for providing in the environment. In some embodiments, the UEMA may use on or more sensors in the environment for assisting in determining that a particular portion of electronic media is appropriate for display or listening. The sensors may use processing to determine the presence of users within the environment. For example, the sensors may operate based on a general-purpose computing device, a specialized device (e.g., a presence detecting device) or specialized hardware and/or software (e.g., an image processor, an audio signal algorithm). In some embodiments, the UEMA may determine based on sensors and metadata that certain electronic media should be provided either in an unaltered or altered format. In some embodiments, the UEMA may determine based on a combination of metadata, sensors, and a user profile to either provide unaltered or an altered version of electronic media. The UEMA may obtain from sensors certain physical characteristics or demographic information regarding users that are present, around, within view or listening distance of, or proximate to a viewing and/or audio device configured to provide the electronic media.

In a first example, the sensors may obtain from sensors certain characteristic regarding a user such as the age or maturity of a user. The user profile of a primary user may be a parent that controls a device and instructs that any electronic media should not provide adult content to any user in the environment that is an underage or a young or restricted user. A second user may not be the owner of, in control of, or associated with the user profile and may be operating a media device. A media device may be a device configured to provide playback, sensing, viewing, listening, perceiving, of audio, video, haptic, or other electronic media. The second user may, for example, be a child of the user associated with the user profile. The second user may select a television show from the media device. The television show may be associated with some metadata that includes information regarding the type of content within the television show (e.g., a flag that indicates violence and an associated timestamp and duration indicative of a portion of the television show that depicts violence). The UEMA may identify the metadata and before displaying the portion of the television show with violence, the UEMA may determine, based on the profile and the sensor data, to skip, block, or otherwise prevent the second child user from viewing the content because the second user is in the environment with the media device.

In a second example, the sensors of the UEMA may obtain certain demographics regarding a user. The sensors may capture that a first user is wearing a shirt of a favorite band while in the environment near a media device. The UEMA may determine that a genre preference of the user is pop music, based on the genre determined from the shirt of the favorite band. Contemporaneously, the user may be selecting a particular movie from a media device such as a smart television. The UEMA may receive the television show from a service provider and may identify from the received television show metadata that indicates a portion of the television show includes dance music. The UEMA may skip, alter, or otherwise update the portion of the television show corresponding to the dance music, such that the user that is wearing a pop music shirt does not have to view (or is presented with an option not to view) the country song in the show.

The UEMA may further preserve any altered content of electronic media. In detail, the UEMA may save any portion of electronic media that is skipped, altered, or otherwise updated. The UEMA may store the saved portion as a copy of the electronic media (e.g., saving the bits that make up the portion of the electronic media that is skipped). The UEMA may store the saved portion as a reference, pointer, or link to the portion of the electronic media that was skipped. The UEMA may store the saved portion at the media device. The UEMA may store the saved portion at a server or remote device. The UEMA may scan the environment of the media device and may periodically (e.g., every five minutes, every 100 milliseconds) or continually determine the presence and possibly determinable attributes of users in the environment. If the condition of the environment changes (e.g., the users in the environment change) the UEMA may then provide the previously skipped portions for consumption. For example, a scene of a sporting match where an injury occurred may have been skipped while a family was in an environment of a streaming device. Later when only an adult is in the room, the streaming device of the UEMA may determine there are no kids in the environment. Based on this determination the UEMA may instruct the streaming device to provide a link or display of the entire sporting event without any edits—or may provide only the skipped portion of the sporting event—to the adult.

Figure 1:
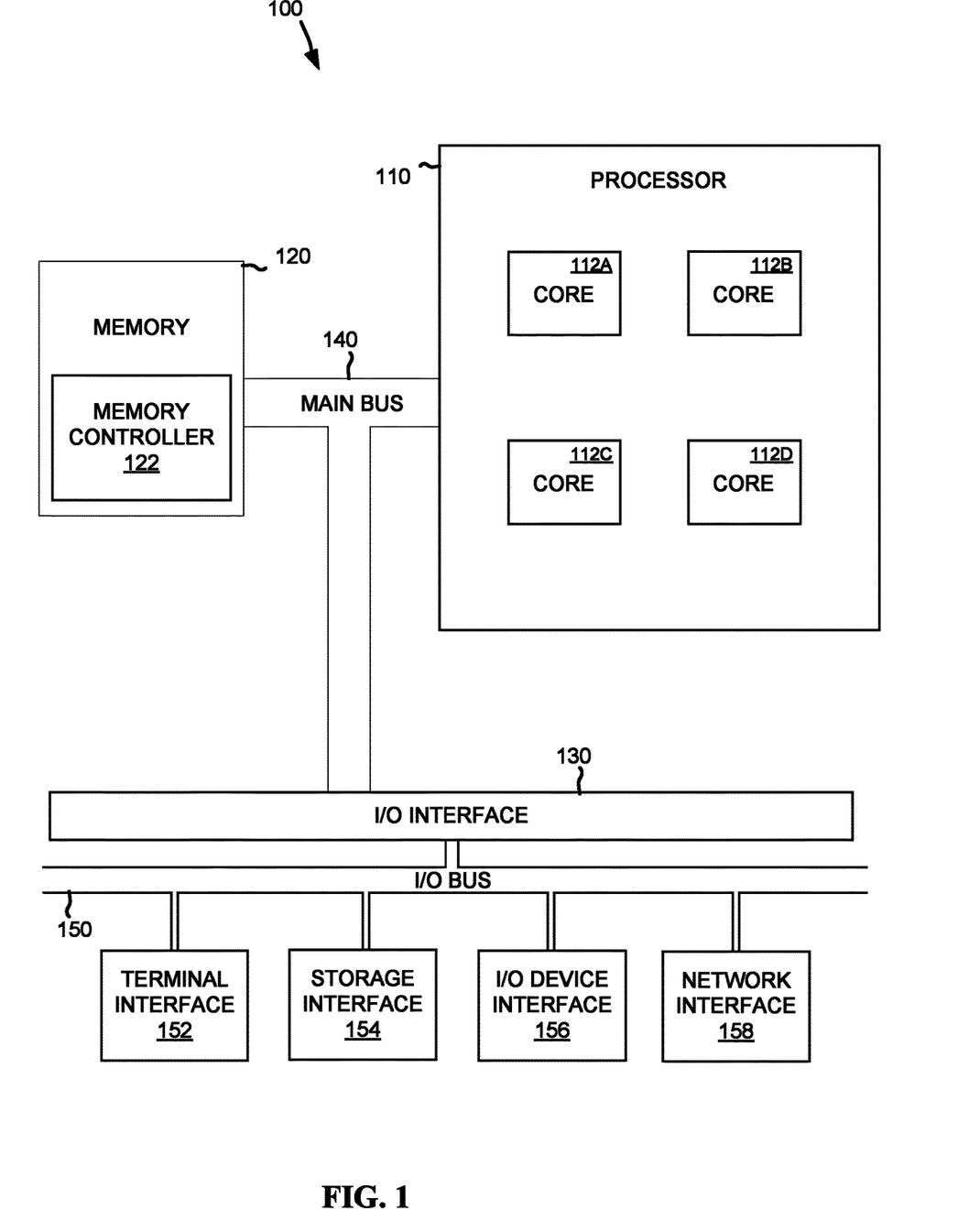
FIG. 1 depicts the representative major components of an example computer system that may be used, in accordance with some embodiments of the present disclosure.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
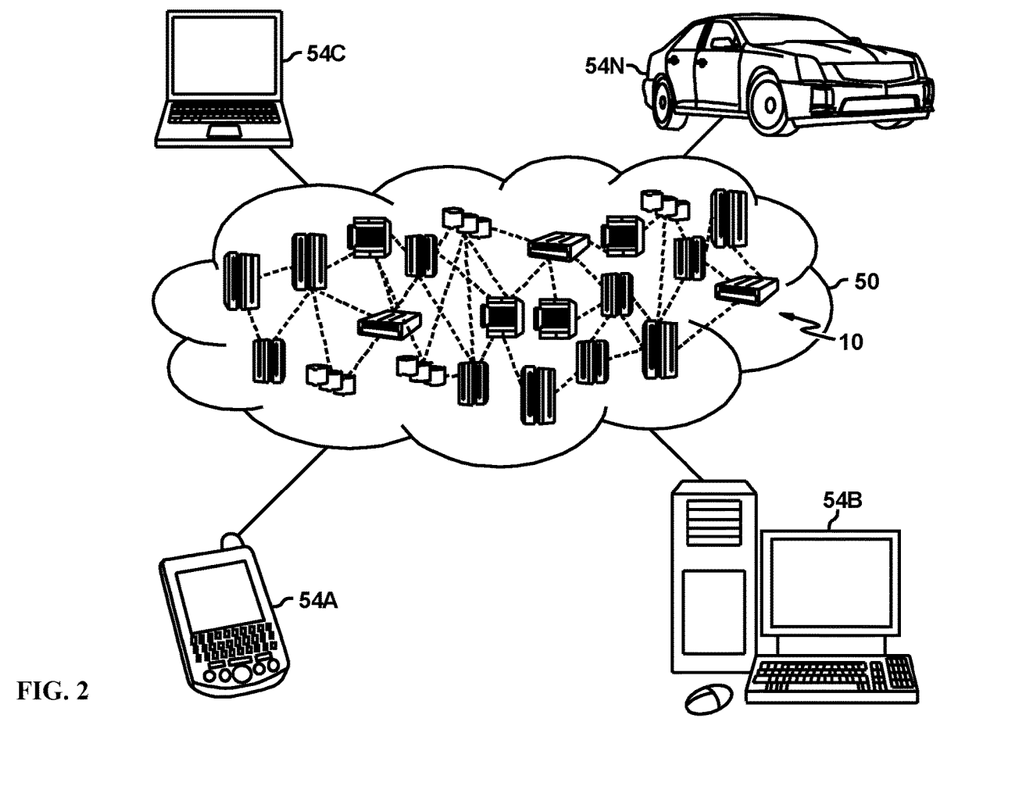
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
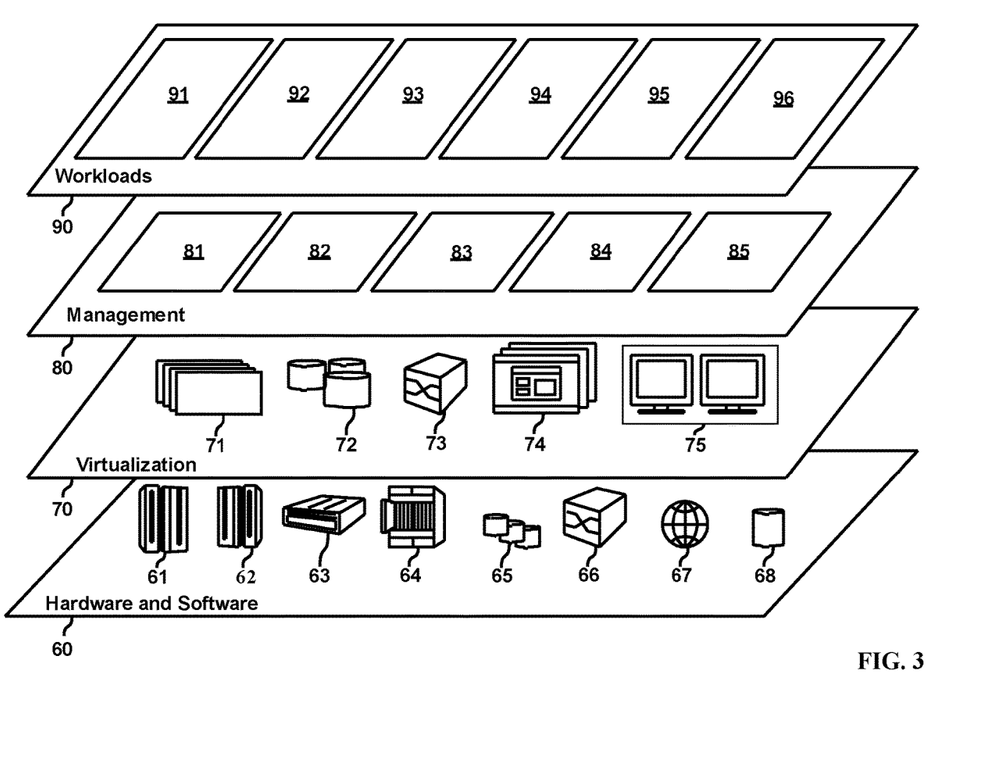
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a UEMA 96.

Figure 4:
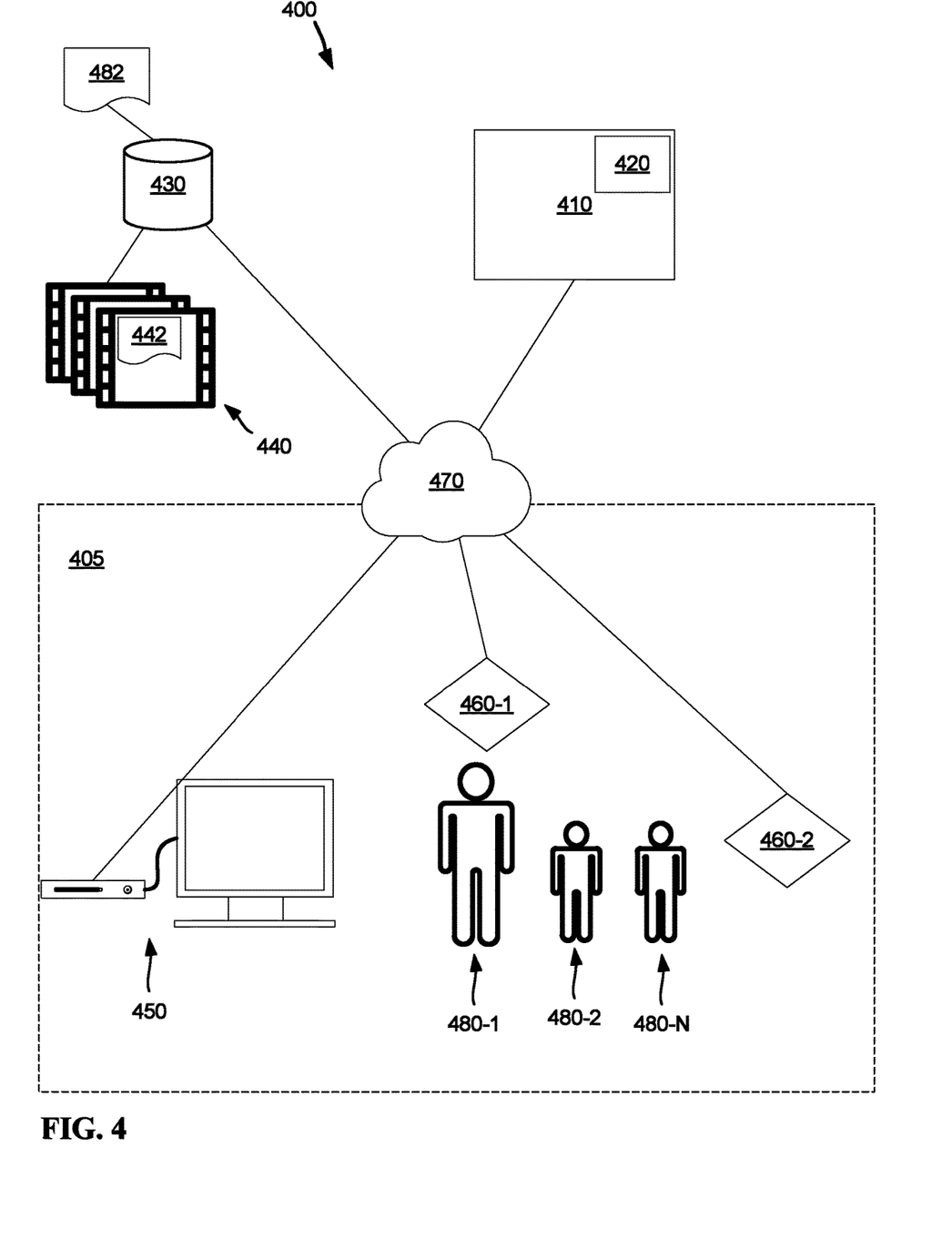
FIG. 4 depicts an example system for performing user-based electronic media alteration (UEMA) consistent with some embodiments of the disclosure.

FIG. 4 depicts an example system 400 for performing UEMA consistent with some embodiments of the disclosure. System 400 may include one or more components configured to facilitate viewing of video and audio content based on one or more users in an environment 405. For example, system 400 may include the following: a computing device 410 for processing requests and determining an environment 405; an image processor 420 for identifying object in the environment; a storage 430 configured to store electronic media 440; a media device 450 configured to provide the electronic media; one or more sensors including sensors 460-1 and 460-2 (collectively, 460); and a network 470.

Some of the components may be located in the environment 405 while other components may be located remotely. For example, as depicted in FIG. 4, the media device 450 and the sensors 460 may be located in the environment 405 and the computing device 410 may be located remotely. In some embodiments, the computing device 410 may also be located in the environment 405. Some of the components may be combined or separated, or physically configured differently from the depictions of FIG. 4. For example, image processor 420 may be separate hardware from the computing device 410. In another example, the computing device 410 may be a party of the media device 450. The storage 430 may be one or more storage devices and associated software configured to store electronic media 440. The electronic media 440 may be audio, visual, or some combination that includes various content and depictions. For example, electronic media 440 may include sporting events, movies, television shows, music, podcasts, audiobooks and the like. Some of the electronic media 440 may include metadata 442. The metadata 442 may be related to the entirety of a given electronic media 440. For example, the metadata 442 may be a rating from a standards body that applies a "PG-13" rating indicative of content that may be inappropriate for children under the age of thirteen. The metadata 442 may be related to only a portion or subset of a given electronic media 440. For example, a television show may have associated metadata 442 that states "adult language" and also a timestamp of "23:35" corresponding to the twenty-third minute and thirty-five second mark of the show.

The media device 450 may be an integrated singular device configured to receive electronic media 440 and display the electronic media, e.g., a smart television. The media device 450 may be multiple devices configured to work collectively to provide electronic media. For example, media device 450 may include a television with speakers and a streaming box. The television may receive a video signal from the streaming box and may provide the audio and/or video to the television for consumption by users 480. The sensors 460 may be audio sensors, such as one or more microphones. The sensors 460 may be visual sensors, such as one or more cameras. The network 470 may communicatively couple the one or more elements of system 400. Network 470 may be made of one or multiple networks, such as a wireless local area network, and a wide area network (e.g., the Internet).

System 400 may be configured to monitor environment 405 to perform UEMA based on the presence of users. For example, environment 405 may include one or more users 480-1, 480-2, and 480-3 (collectively, 480). The users 480 may have various characteristics and demographic information. For example, user 480-1 may be an adult and user 480-2 may be a child. User 480-1 and user 480-2 may each have differing traits or physical characteristics. For example, user 480-1 may have differing physical attributes such as a height, weight, and arm-span that is indicative of user 480-1 being an adult. In another example, user 480-1 may speak with a voice that has a tone or other audible characteristics indicative of adulthood. In yet another example, user 480-1 may move or balance that is visually indicative of an adult. Likewise, user 480-2 may have physical visual characteristics, visual movement, or auditory characteristics that define the user as a child. For example, user 480-2 may move with an unsteady balance, may be under four feet in height, and may speak with a high-pitched voice.

Computing device 410 may be a computer configured to receive signals from sensors 460 and receive requests from media device 450 for listening to a viewing electronic media 440. Computing device 410 may be a single computer, such as computer system 100. Computing device 410 may be a part of a cloud computer, such as being provided from cloud computing environment 50.

Computing device 410 may be configured to process audio signals and may be configured to determine the presence of users 480 in environment 405. For example, computing device 410 may determine based on parts of speech, the tone of voices, or the number of voices that users 480 are within environment 405. The computing device 410 may store recordings of the users 480 from previous interaction with system 400 and may use the previous recordings to determine the presence of users. For example, at a first time, computing device 410 may store a recording of user 480-1 and may associate user 480-1 with a user permission to consume unaltered versions of electronic media 440. At a second time after the first time, computing device 410 may receive from sensors 460 audio signals that correspond to a user 480-2 that is speaking. Computing device 410 may perform voice analysis and matching to compare the prior recording of user 480-1 with the audio signals of user 480-2. Based on the voice analysis, computing device 410 may determine that user 480-2 does not match user 480-1. Based on determining that user 480-2 is not 480-1, computing device 410 may determine a view permission that unaltered electronic media 440 should not be provided to media device 450. The processing of audio signals may be configured based on a specific user. For example, each user 480 in the environment 405 may have created in computing device 410 a fingerprint, or other signature of their voice. The signature may be used to perform the determination of the present of users 480. In some embodiments, the processing of audio signals may be of a general characterization based on sensed attributes, such as without sampling a specific user and creating a fingerprint and/or signature of the specific user. In some embodiments, a tiered approach may make a determination based on a general characterization and based on a specific user. For example, a first adult user may have a very high-pitched voice. The first user may be identified by general characterization as a child. The first user may be identified by the fingerprint and/or signature as an adult. In the case of conflicts between the two determination techniques, the computing device 410 may default to a specific fingerprint and/or signature determination. In some embodiments, the computing device 410 may operate in a probabilistic manner. For example, a predetermined identification threshold may be used to apply determining of a user based on audio signals. If the age of the person in the room cannot be determined with an identification threshold of, e.g., 50% certainty, then it will be presumed that the person is a child and present the most restrictive form of the electronic media (or vice versa).

Computing device 410 may include image processor 420 configured to determine the presence of users 480 in environment 405. The image processor 420 may be a collection of hardware and/or software, such as an application specific integrated circuit or a specific image analysis routine executing on a general processor.

The image processor 420 may be configured to perform various image analysis techniques. The image analysis techniques may be machine learning and/or deep learning based techniques. These techniques may include, but are not limited to, region-based convolutional neural networks (R-CNN), you only look once (YOLO), edge matching, clustering, grayscale matching, gradient matching, invariance models, geometric hashing, scale-invariant feature transform (SIFT), speeded up robust feature (SURF), histogram of oriented gradients (HOG) features, and single shot multibox detector (SSD). In some embodiments, the image processor may be configured to aid in identifying a face of a given user 480 (e.g., by analyzing images of faces using a model built on training data).

In some embodiments, objects may be identified using an object detection algorithm, such as an R-CNN, YOLO, SSD, SIFT, Hog features, or other machine learning and/or deep learning object detection algorithms. The output of the object detection algorithm may include one or more identities of one or more respective objects with corresponding match certainties. For example, environment 405 may be analyzed based on visual data received from sensors 460. Using a relevant object detection algorithm, the presence of a given user 480 in environment 405 may be identified.

In some embodiments, features of the objects may be determined using a supervised machine learning model built using training data. For example, an image may be input into the supervised machine learning model and various classifications detected within the image can be output by the model. For example, characteristics such as object material (e.g., cloth, metal, plastic, etc.), shape, size, color, and other characteristics may be output by the supervised machine learning model. Further, the identification of objects (e.g., a house plant, a human face, a dog, etc.) can be output as classifications determined by the supervised machine learning model. For example, if a user 480-1 snaps an image of a face of another user 480-2, a supervised machine learning algorithm may be configured to output an identity of the object (e.g., child) as well as various characteristics of user 480-2 (e.g., a height of the child provided by user 480-1, the age of the child provided by the user, etc.).

In some embodiments, characteristics of objects may be determined using photogrammetry techniques. For example, shapes and dimensions of objects may be approximated using photogrammetry techniques. As an example, if a user 480-1 provides an image of a basket, the diameter, depth, thickness, etc. of the basket may be approximated using photogrammetry techniques. In another example, user 480-2 provide a picture of user 480-1 and the height and weight of user 480-1 may be determined by using photogrammetry techniques. In some embodiments, characteristics of objects may be identified by referencing an ontology. For example, if an object is identified (e.g., using an R-CNN), the identity of the object may be referenced within an ontology to determine corresponding attributes of the object. The ontology may indicate attributes such as size, shape, use, etc. of an example woodworking tool that is placed in a scene that is photographed.

Characteristics may include the shapes of objects, dimensions (e.g., height, length, and width) of objects, a number of objects (e.g., the presence of three users 480 in environment 405), shading or chroma values of an object, and/or other attributes of objects. In some embodiments, the output may generate a list including the identity and/or characteristics of objects (e.g., cotton shirt of user 480-1, metal glasses of user 480-2, etc.). In some embodiments, the output may include an indication that an identity or characteristic of an object is unknown. The indication may include a request for additional input data that can be analyzed such that the identity and/or characteristics of objects may be ascertained. For example, a user 480 may be prompted by computing device 410 to provide features or attributes of the surroundings (not depicted) such as house plants, chairs, tables, pictures on walls in environment 405. The features may be provided by a user 480 to computing device 410 and image processor 420 may use the provided features to help understand the environment 405. For example, a face may be depicted in a painting hanging on a wall (not depicted). The face may not be representative of any user 480 that could ever be in the environment 405. Based on prompting for the presence of potential faces identified by image processor 420, the user 480 can tell computing device 410 to ignore the painting. In some embodiments, various objects, object attributes, and relationships between objects (e.g., hierarchical and direct relations) may be represented within a knowledge graph (KG) structure. Objects may be matched to other objects based on shared characteristics, relationships with other objects (e.g., an eye belongs to a face), or objects belonging to the same class.

The computing device 410 may also provide for the creation of a profile of a given user 480. For example, user 480-1 may create profile 482 by interacting directly with computing device 410. In some embodiments, user 480-1 may interact indirect with computing device 410 to create profile 482. For example, user 480-1 may interact with display device 450 to input information that forms a part of profile 482, and display device 450 may provide the information to computing device 410 through network 470. The profile 482 may be stored locally in display device 450. In some embodiments, profile 482 may be stored in storage 430.

The computing device 410 may be configured to perform UEMA. For example, the computing device 410 may receive a request from a user 480 to view electronic media 440. The computing device 410 may be configured to retrieve from the storage 430 the requested electronic media 440 and any associated metadata 442. The computing device 410 may provide the media device 450 with the requested electronic media 440 in an original format (e.g., without any alterations).

The computing device 410 may provide an updated version of a requested electronic media 440 based on one or more factors. For example, computing device 410 may identify metadata 442 associated with the requested electronic media 440. The computing device 410 may compare the metadata 442 with a profile 482. The computing device 410 may determine a view permission of the requested electronic media based on a comparison of the metadata 442 to the profile 482. The computing device 410 may compare the metadata 442 to the presence of, and characteristics of, the one or more users 480 in environment 405. The computing device 410 may determine a view permission of the requested electronic media 440 based on the detection of the users 480 and comparison of the detected users to the metadata 442.

The computing device 410 may be configured to update metadata 442 of an electronic media 440 based on a user input. For example, a user 480 may view electronic media 440 in environment 405 through media device 450. The user 480 may determine that a particular portion of the media 440 includes certain content or depictions, and the user may indicate that the particular portion should be tagged with new metadata. For example, while watching a television show, a user 480 may indicate that a scene in the show includes violence. The user 480 may input into the media device 450 an input (e.g., by tapping a button on a remote, or touching a touchscreen). The user 480 may input into another device (not depicted), such as a smartphone of the user, the input. The input may be received by the computing device 410 and may be associated with a given electronic media 440—for example, by adding to an existing metadata 442 of electronic media 440. In another example, by creating a new metadata (not depicted) and associating the new metadata with the electronic media. In some embodiments, the tags and metadata received from the computing device 410 may be used for determining and associating metadata with the stored electronic media 440. For example, upon receiving, a threshold number of indications that a scene includes violence, appropriate metadata could be added to the electronic media 440 in the storage 430. Other users that request the electronic media 440 may be presented with a copy that includes updates or alterations based on the added metadata.

Figure 5:
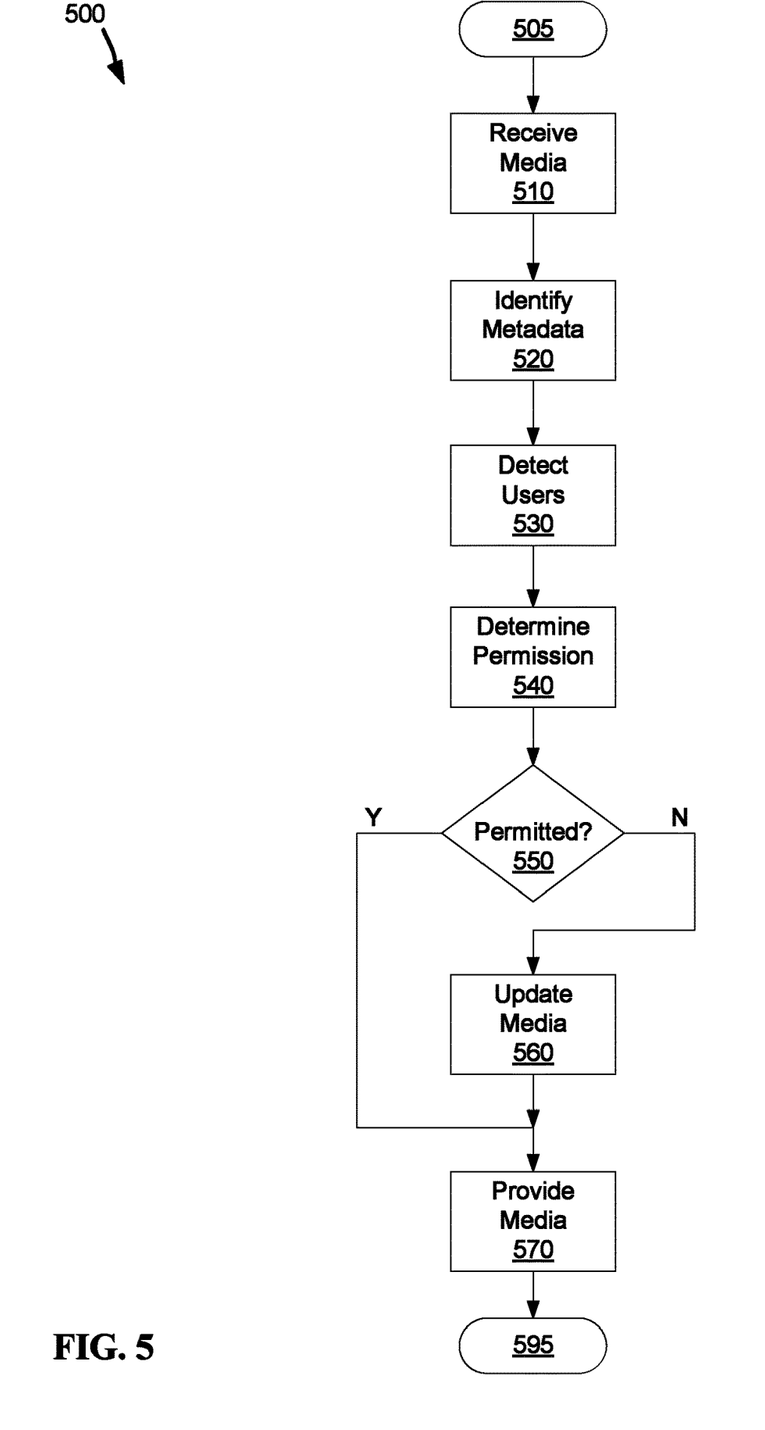
FIG. 5 depicts an example method of UEMA, consistent with some embodiments of the disclosure.

FIG. 5 depicts an example method 500 of UEMA, consistent with some embodiments of the disclosure. Method 500 may be performed by a playback device. For example, method 500 may be performed by display device 450 of FIG. 4. In some embodiments, method 500 may be performed by a computing device, such as computing device 410 of FIG. 4.

From start 505, an electronic media may be received 510. The electronic media may be received from a datastore, central service provider, or other relevant electronic media provider—for example, from a streaming music provider or a cable provider. The received media may include metadata. For example, a received video may include one or more flags or attributes that describe one or more portions of the video. At 520, the metadata associated with the received media may be identified. The identification of the metadata may be based on performing a scan of the received media. The identification of the metadata may be based on performing a lookup. For example, the received media may include one or more attributes, such as a run time, a file name, a uniform resource identifier, a title, an author, and the like. Identification of the metadata may include requesting of, and receiving from, a server, storage, or metadata repository for any associated metadata that is assigned to or associated with the electronic media.

At 530 one or more users in the environment may be detected. The detection of the users may be based on receiving audio or video of the environment (e.g., environment information) from one or more audiovisual sensors (e.g., microphone, camera, lidar). The detection of the users may be based on comparing the environment information to a pre-generated model of the environment. For example, at a time before receiving the media, the environment may be modeled from the audiovisual sensors.

At 540 a playback permission of the received media may be determined. The playback permission may be related to the consumption of electronic media and portions of electronic media (e.g., allowed to view movies, not allowed to watch portions of television that include violence, does not prefer to listen to rock n' roll music). The playback permission may be a view permission in the case of a visual electronic media. The playback permission may be a listen permission in the case of audio electronic media. The determination may be based on comparing the metadata to a profile of a user. For example, a first user may setup a playback device in the environment and may register a profile. The profile may include genre, title, content, or other relevant information regarding the type of electronic media and the depictions in the content that are acceptable. The user may also register one or more users that are allowed to view the content. The user may register a picture of themselves or a three-dimensional (3D) model of themselves. The user may also register a picture or 3D model of other users that may enter the environment. The user may register in the profile that other users may or may not view certain media. For example, a first user may enter into a profile of the first user visual and auditory information of a second user that is a child. The profile of the first user may be stored on the playback device or may be stored on a remote server. The first user may associate a first set of permissions with the presence of the first user. The first user may associate a second set of permissions with the presence of the second user.

The presence of one or more users may override the presence of one or more other users. In a first example, a first user may create a profile that indicates that if the first user is present, any type of electronic media may be consumed regardless of the presence of other users. In a second example, a first user (such as a parent) may create a profile that indicates that if a second user (such as a child user) is present in an environment, the preferences and view permissions of the first user should be ignored, and adult-appropriate content in electronic media should not be provided to any playback devices. The user profile may include information regarding the various users. For example, physical characteristics of certain users (e.g., height, weight, general appearance) may be stored in the profile. The playback device may be configured to determine that a playback permission is to not play certain portions of media based on the presence of certain users or certain users matching certain characteristics or demographics. For example, by default, a playback device may be configured to not display a portion of a movie that includes the depiction of war if a user wearing a "peace" shirt is present.

If a user permission includes that a user is permitted to view a received media, at 550:Y, then the electronic media is provided to the user at 570. If a user permission includes that a user is not permitted to view a received media, at 550:N, then the received media is updated at 560. The received media may be updated by removing, skipping, blocking, blurring, obscuring, muting, or otherwise altering the electronic media. The received media is altered based on the associated metadata. The associated metadata may include a timestamp, frame start and end, duration, scene identifier, word identifier, or other information that indicates the entirety of the portion that should be altered. The altered portion may be stored or a link to the altered portion may be saved for providing later, such as when the environment of the playback device changes. For example, a first set of users that includes a child may indicate that a view permission indicates that a portion of a media should be updated at 560 to skip a romantic scene. The love scene may be saved and stored, such as stored with the profile of a user. At another time, a second set of users that does not include a child may be present and the saved love scene may be presented to the second set of users for optional playback by the second set of users. After the received media is provided to the users, method 500 may end at 595.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   receiving, at a first display device located in a first environment, an electronic media from a datastore of a service provider, wherein the datastore includes a set of metadata associated with the electronic media;
   detecting one or more users including a first user in the first environment based on a first user profile, wherein the detecting includes identifying one or more physical characteristics of the first user;
   determining a view permission of the first user, the view permission indicating that the first user is not permitted to view media associated with a first content classification;
   determining, based on the set of metadata, that at least one portion of the electronic media is associated with the first content classification;
   saving the at least one portion with the first user profile;
   performing, based on the view permission of the first user, a first electronic media update to the electronic media by altering the at least one portion of the electronic media, wherein the first electronic media update includes at least one of: removing, skipping, blocking, blurring, obscuring, or muting the at least one portion;
   displaying, after performing the first electronic media update, the electronic media by the first display device;
   detecting, after the altering the at least one portion, one or more second users in the first environment, wherein the one or more second users do not include the first user;
   determining, based on the one or more second users, a second view permission, the second view permission indicating the at least one portion of the electronic media is viewable by the one or more second users; and
   displaying, on the first display device, only the at least one portion of the electronic media previously saved with the first user profile.

2. The method of claim 1, wherein the method further comprises:
   receiving the electronic media at a second display device, the second display device located in a second environment;
   detecting one or more third users including a third user in the second environment;
   determining a third view permission of the third user;
   performing, based on the third view permission of the third user, a second electronic media update to the electronic media; and
   displaying, after performing the second electronic media update, the electronic media by the second display device.

3. The method of claim 1, wherein:
   the detecting the first user includes detecting the first user profile of the first user, and
   the determining the view permission of the first user includes comparing metadata from the first user profile to the set of metadata.

4. The method of claim 1, wherein the detecting the first user includes receiving environment information from a sensor located in the first environment.

5. The method of claim 4, wherein:
   the sensor is an audio sensor configured to receive an audio signal, and
   the environment information located in the first environment is an audio recording of the first environment contemporaneous with the receiving of the electronic media.

6. The method of claim 4, wherein:
   the sensor is a visual sensor, and
   the environment information located in the first environment is an image from the visual sensor located in the first environment.

7. The method of claim 6, wherein:
   detecting the first user includes comparing the environment information to the user profile, the user profile including user preferences regarding the display of the electronic media, and
   the user preferences include characteristics of certain users and view permissions related to the certain users.

8. The method of claim 7, wherein the user profile is not a profile of the first user.

9. The method of claim 1, wherein the performing the first electronic media update includes skipping the at least one portion of the electronic media.

10. The method of claim 1, wherein the method further comprises:
    receiving, at a first time, a new metadata item from at least one user of the one or more users in the first environment;
    associating, at the first time, a second portion of the electronic media with the new metadata item; and
    providing the new metadata item to additional display devices.

11. The method of claim 1, further comprising:
    receiving a new content classification for a portion of the electronic media;
    determining that the new content classification was input by a number of viewers greater than a threshold number; and
    in response to the number of viewers being greater than the threshold number, adding the new content classification to the set of metadata in the datastore of the service provider.

12. A system, the system comprising:
a memory, the memory containing one or more instructions; and
a processor, the processor communicatively coupled to the memory, the processor, in response to reading the one or more instructions, configured to:
- receive, at a first display device located in a first environment, an electronic media from a datastore of a service provider, wherein the datastore includes a set of metadata associated with the electronic media;
- detect one or more users including a first user in the first environment based on a first user profile, wherein the detecting includes identifying one or more physical characteristics of the first user;
- determine a view permission of the first user, the view permission indicating that the first user is not permitted to view media associated with a first content classification;
- determine, based on the set of metadata, that at least one portion of the electronic media is associated with the first content classification;
- save the at least one portion with the first user profile;
- perform, based on the view permission of the first user, a first electronic media update to the electronic media by altering the at least one portion of the electronic media, wherein the first electronic media update includes at least one of: removing, skipping, blocking, blurring, obscuring, or muting the at least one portion;
- display, after the first electronic media update, the electronic media by the first display device;
- detect, after the altering the at least one portion, one or more second users in the first environment, wherein the one or more second users do not include the first user;
- determine, based on the one or more second users, a second view permission, the second view permission indicating the at least one portion of the electronic media is viewable by the one or more second users; and
- display, on the first display device, only the at least one portion of the electronic media previously saved with the first user profile.

13. The system of claim 12, wherein the processor is further configured to:
- receive the electronic media at a second display device, the second display device located in a second environment;
- detect one or more third users including a third user in the second environment;
- determine, based on the set of metadata, a third view permission of the third user;
- perform, based on the third view permission of the third user, a second electronic media update to the electronic media; and
- display, after the second electronic media update, the electronic media by the second display device.

14. The system of claim 12, wherein the detecting the first user includes receiving environment information from a sensor located in the first environment.

15. The system of claim 14, wherein:
- the sensor is an audio sensor configured to receive an audio signal, and
- the environment information located in the first environment is an audio recording of the first environment contemporaneous with the receiving of the electronic media.

16. A computer program product, the computer program product comprising:
one or more computer readable storage media; and
program instructions collectively stored on the one or more computer readable storage media, the program instructions configured to:
- receive, at a first display device located in a first environment, an electronic media from a datastore of a service provider, wherein the datastore includes a set of metadata associated with the electronic media;
- detect one or more users including a first user in the first environment based on a first user profile, wherein the detecting includes identifying one or more physical characteristics of the first user;
- determine a view permission of the first user, the view permission indicating that the first user is not permitted to view media associated with a first content classification;
- determine, based on the set of metadata, that at least one portion of the electronic media is associated with the first content classification;
- save the at least one portion with the first user profile;
- perform, based on the view permission of the first user, a first electronic media update to the electronic media by altering the at least one portion of the electronic media, wherein the first electronic media update includes at least one of: removing, skipping, blocking, blurring, obscuring, or muting the at least one portion; and
- display, after the first electronic media update, the electronic media by the first display device;
- detect, after the altering the at least one portion, one or more second users in the first environment, wherein the one or more second users do not include the first user;
- determine, based on the one or more second users, a second view permission, the second view permission indicating the at least one portion of the electronic media is viewable by the one or more second users; and
- display, on the first display device, only the at least one portion of the electronic media previously saved with the first user profile.

17. The computer program product of claim 16, wherein the performing the first electronic media update includes skipping the at least one portion of the electronic media.

* * * * *